United States Patent [19]

Ishii et al.

[11] Patent Number: 5,051,826
[45] Date of Patent: Sep. 24, 1991

[54] VERTICAL EDGE DETECTION CIRCUIT FOR A TELEVISION IMAGE MOTION ADAPTIVE PROGRESSIVE SCANNING CONVERSION CIRCUIT

[75] Inventors: Satoyuki Ishii; Susumu Komatsu, both of Kanagawa, Japan

[73] Assignee: Kabushiki Kaisha Toshiba, Kawasaki, Japan

[21] Appl. No.: 486,433

[22] Filed: Feb. 28, 1990

[30] Foreign Application Priority Data

Feb. 28, 1989 [JP] Japan .................................. 1-49033

[51] Int. Cl.$^5$ .............................................. H04N 7/01
[52] U.S. Cl. .................................. 358/140; 358/105; 358/136; 358/135
[58] Field of Search ................. 358/140, 105, 136, 11, 358/135

[56] References Cited

U.S. PATENT DOCUMENTS

| | | | |
|---|---|---|---|
| 4,626,891 | 12/1986 | Achiha | 358/105 |
| 4,794,454 | 12/1988 | Sugiyama | 358/105 |
| 4,811,092 | 3/1989 | Achiha | 358/105 |
| 4,885,631 | 12/1989 | Fukinuki | 358/105 |
| 4,924,305 | 5/1990 | Nakagawa | 358/140 |

Primary Examiner—Howard W. Britton
Assistant Examiner—Sherrie Hsia
Attorney, Agent, or Firm—Oblon, Spivak, McClelland, Maier & Neustadt

[57] ABSTRACT

A vertical edge detection circuit for a progressive scanning conversion circuit including an input circuit for receiving an interlaced scanning television signal, a first circuit for generating an intra-field difference signal from the interlaced scanning television signal, a second circuit for generating an inter-field difference signal from the interlaced scanning television signal and a third circuit for selectively outputting a maximum value one of the intra-field and inter-field difference signals.

5 Claims, 7 Drawing Sheets

VERTICAL EDGE DETECTION CIRCUIT FOR A TELEVISION IMAGE MOTION ADAPTIVE PROGRESSIVE SCANNING CONVERSION CIRCUIT

FIELD OF THE INVENTION

The present invention relates generally to an image motion detecting circuit for a motion adaptive progressive scanning conversion circuit, and more particularly, to a vertical edge detection circuit suitable for such an image motion detecting circuit.

BACKGROUND OF THE INVENTION

In the NTSC color television system, an interlace scanning system has been adopted. The interlace scanning system has an advantage in that television signals can be transmitted at a narrow frequency band. However, the interlace scanning system has a drawback in that an image displayed generation is easily affected of disturbances such a line flicker. In particular, such disturbances are conspicuous in wide screen display television receivers. Recently, a progressive scanning conversion system has been developed to overcome the disturbances. In this progressive scanning conversion system, the interlace scanning television signal is converted to a progressive scanning television signal by increasing scanning lines. The increased scanning line is generated from the interlace scanning television signal. In the interlace scanning television signal, two pixels adjacent between two lines or two fields have a relatively strong correlation. For instance, in an image in rest (referred to as static image hereafter) carried by the television signal, two pixels adjacent between two lines have a strong correlation in the time direction. In an image in motion (referred to as moving image hereafter), two pixels adjacent between two fields have a strong correlation. Thus, the increased scanning line is generated by using the correlation of pixels adjacent between two lines or two fields. The increased scanning line is then interpolated as an interpolation line between two adjacent lines of the interlace scanning television signal.

Thus, there are two systems for generating the interpolation line. In one system, the interpolation line is formed by using two adjacent lines in the same field of the interlace scanning television signal. This system will be referred to as an intra-field interpolation system hereafter. In this system, a line memory which delays the television signal for a horizontal scanning period (referred to as a 1H hereafter) is used for generation of the interpolation signal. In another system, the interpolation line is formed by using two corresponding lines of two adjacent fields of the interlace scanning television signal. This system will be referred to as an inter-field interpolation system hereafter. In this system, a field memory which delays the television signal for a field scanning period (referred to as a 262H hereafter) is used for generation of the interpolation signal. The former system is suitable for the moving image. The latter system is suitable for the static image.

Recently, a motion adaptive progressive scanning conversion circuit has been developed. In this circuit, both the intra-field interpolation system and the inter-field interpolation system are properly used in response to a degree of motion of the image.

FIG. 1 shows a conventional progressive scanning conversion circuit. The principal system of the progressive scanning conversion circuit is disclosed in "SMPTE Journal", May 1984, pp. 470-476, by Masahiko ACHIHA et al. In FIG. 1, an interlace scanning television signal is applied to an inter-field interpolation signal generator 10, an intra-field interpolation signal generator 12 and a motion detector 14 through an input terminal 16. The interlace scanning television signal on the input terminal 16 will be referred to as an input television signal hereafter. The inter-field interpolation signal generator 10 generates a first interpolation signal IS1 from two lines in corresponding position of two fields of the input television signal. The intra-field interpolation signal generator 12 generates a second interpolation signal IS2 from two adjacent lines in the same field of the input television signal. These first and second interpolation signals IS1, IS2 are applied to a mixer 18. The mixer 18 mixes the first and second interpolation signals IS1, IS2 at a ratio determined by the motion detector 14. The motion detector 14 detects a degree of motion of an image carried by the input television signal.

FIG. 2 shows a detail of the motion detector 14. In FIG. 2, the input television signal is applied to a frame memory 20 which delays the television signal for a frame scanning period (referred to as a 524H period hereafter). The 524H delayed television signal output from the frame memory 20 and the input television signal are applied to a first subtractor 22. The first subtractor 22 subtracts the signals from each other. Thus, a first difference signal of the signals is output from the first subtractor 22.

The input television signal represents a signal of a current frame of the image carried by the input television signal. While the 524H delayed television signal represents a signal of a prior frame of the image carried by the input television signal. Thus, the first difference signal shows a difference between corresponding signals of the two frames. The first difference signal will thus be referred to as an inter-frame difference signal. This inter-frame difference signal varies in response to a degree of image motion from the image of the prior frame to the image of the current frame. The inter-frame difference signal is applied to a coring circuit 24 through a first absolute value circuit 26 and a spatiotemporal filter 28. The first absolute value circuit 26 takes an absolute value of the inter-frame difference signal. The spatiotemporal filter 28 includes a cyclic memory and a maximum value circuit, as well known to the person in the art. Thus, a predetermined number of samples of the inter-frame difference signals A-E, as shown in FIG. 4 are obtained.

Referring now to FIG. 4, the operation of the spatiotemporal filter 28 will be briefly explained. FIG. 4 diagrammatically shows scanning lines in several successive fields of the input signal, i.e., the interlaced scanning television signal. The circuit block comprising the frame memory 20 and the first subtractor 22 in FIG. 2 successively outputs the inter-frame difference signal for each line signals. That is, the samples A, B, C, ..., as shown in FIG. 4, are successively applied to the spatiotemporal filter 28. Then, the cyclic memory of the spatiotemporal filter 28 stores the samples and simultaneously outputs a predetermined number of the samples, e.g., the samples A-E. The maximum value circuit of the spatiotemporal filter 28 then selectively outputs a maximum one, i.e., the best of the samples.

The coring circuit 24 depresses the inter-frame difference signal output from the spatiotemporal filter 28 until the inter-frame difference signal increases over a threshold level of the coring circuit 24, as shown in FIG. 3. The threshold level varies in response to a vertical edge detector 30 which is coupled between the input terminal 16 and the coring circuit 24.

FIG. 5 shows a detail of the vertical edge detector 30. In FIG. 5, the input television signal is applied to a line memory 32 which delays the television signal for the 1H period. The 1H delayed television signal output from the line memory 32 and the input television signal are applied to a second subtractor 34. The second subtractor 34 subtracts the signals from each other. Thus, a second difference signal of the signals is output from the second subtractor 34.

The input television signal represents a signal of a current horizontal scanning line of the image carried by the input television signal. While the 1H delayed television signal represents a signal of a prior horizontal scanning line of the image carried by the input television signal. Thus, the second difference signal shows a difference between corresponding signals of the two lines. The second difference signal will thus be referred to as an inter-line difference signal. This inter-line difference signal varies in response to a degree of pattern change of the image between two adjacent lines. Thus, the pattern change of the image along the vertical direction is detected by the vertical edge detector 30. The pattern change of the image along the vertical direction will be referred to as a change of vertical edge hereafter.

This inter-line difference signal is applied to a control terminal of the coring circuit 24 through a second absolute value circuit 36. The second absolute value circuit 36 takes an absolute value of the line difference signal. Thus, the threshold level of the coring circuit 24 is controlled by the inter-line difference signal. When the change of vertical edge becomes remarkable, the inter-line difference signal increases. Then, the threshold level of the coring circuit 24 shifts rightward in the graph of FIG. 3. Thus, the response of the coring circuit 24 is depressed against a relatively low value of the inter-frame difference signal supplied from the spatiotemporal filter 28 (see FIG. 3). An output of the coring circuit 24 is applied to the mixer 18 (see FIG. 1) as a signal representing a degree of image motion. This output signal will be referred as to a motion representing signal hereafter.

Referring back to FIG. 1, the mixer 18 mixes the first and second interpolation signals IS1, IS2 at the ratio determined by the motion representing signal output from the motion detector 14. Thus, the mixer 18 outputs a third interpolation signal IS3 which includes the first and second interpolation signals IS1, IS2. When the ratio of the first interpolation signal IS1 is given by K ($0 \leq K \leq 1$), the ratio of the second interpolation signal IS2 is given by $1-K$). Then, the third interpolation signal IS3 is given as follows, $$IS3 = K \cdot IS1 + (1-K) \cdot IS2$$

The third interpolation signal IS3 is applied to a time compressor 38 together with the interlaced scanning signal from the input terminal 16. The time compressor 38 interpolates the interlaced scanning signal with the third interpolation signal IS3. Thus, a progressive scanning television signal is output from the time compressor 38.

In the conventional progressive scanning conversion circuit, the vertical edge detector, as shown in FIG. 5, has a problem for detecting the vertical edge for both the moving image and the static image. That is, the first interpolation signal IS1 is generated by signals from two fields in response to the moving image. While, the conventional vertical edge detector 30 operates on line signals of only the same field. Thus, the conventional vertical edge detector 30 cannot be adapted for a vertical sampling frequency of the NTSC system interlaced scanning television signal. The vertical sampling frequency is given by the number of scanning lines of one field. For example, each field of the NTSC system interlaced scanning television signal has the vertical sampling frequency higher than 525/2 cph (cycles/picture height). As one frame of the image is completed by two fields, i.e., odd and even fields, each frame of the NTSC system interlaced scanning television signal can be transmitted at a vertical sampling frequency higher than 525/2 cph.

A frequency response of the conventional vertical edge detector 30 has a peak at the 525/4 cph, and decreases to zero at the 525/2 cph because it operates on the line signals of the same field, as described above. Thus, the conventional vertical edge detector 30 is not able to detect properly the vertical edge in case of the moving image.

The conventional progressive scanning convertion circuit has another drawback in that the circuit erroneously operates to a pitching movement of images. That is, when the static image pitches due to noises or an unstable setting of a camera, the image moves in the vertical direction. In this case, some inter-frame difference signals, e.g., the sample B, as shown in FIG. 4, have a large value. Thus, the motion detector 14 erroneously judges the static image as a moving image according to the operation of the spatiotemporal filter.

SUMMARY OF THE INVENTION

It is, therefore, an object of the present invention to provide a vertical edge detection circuit which has a proper frequency response for detecting a vertical edge in case of moving images.

Another object of the present invention is to provide a vertical edge detection circuit which is able to be adapted properly for a pitching movement of static image.

In order to achieve the above object, a vertical edge detection circuit according to one aspect of the present invention includes an input circuit for receiving an interlaced scanning television signal, a first circuit for generating an intra-field difference signal from the interlaced scanning television signal, a second circuit for generating an inter-field difference signal from the interlaced scanning television signal and a third circuit for selectively outputting a maximum value one of the intra-field and inter-field difference signals.

Additional objects and advantages of the present invention will be apparent to persons skilled in the art from a study of the following description and the accompany drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
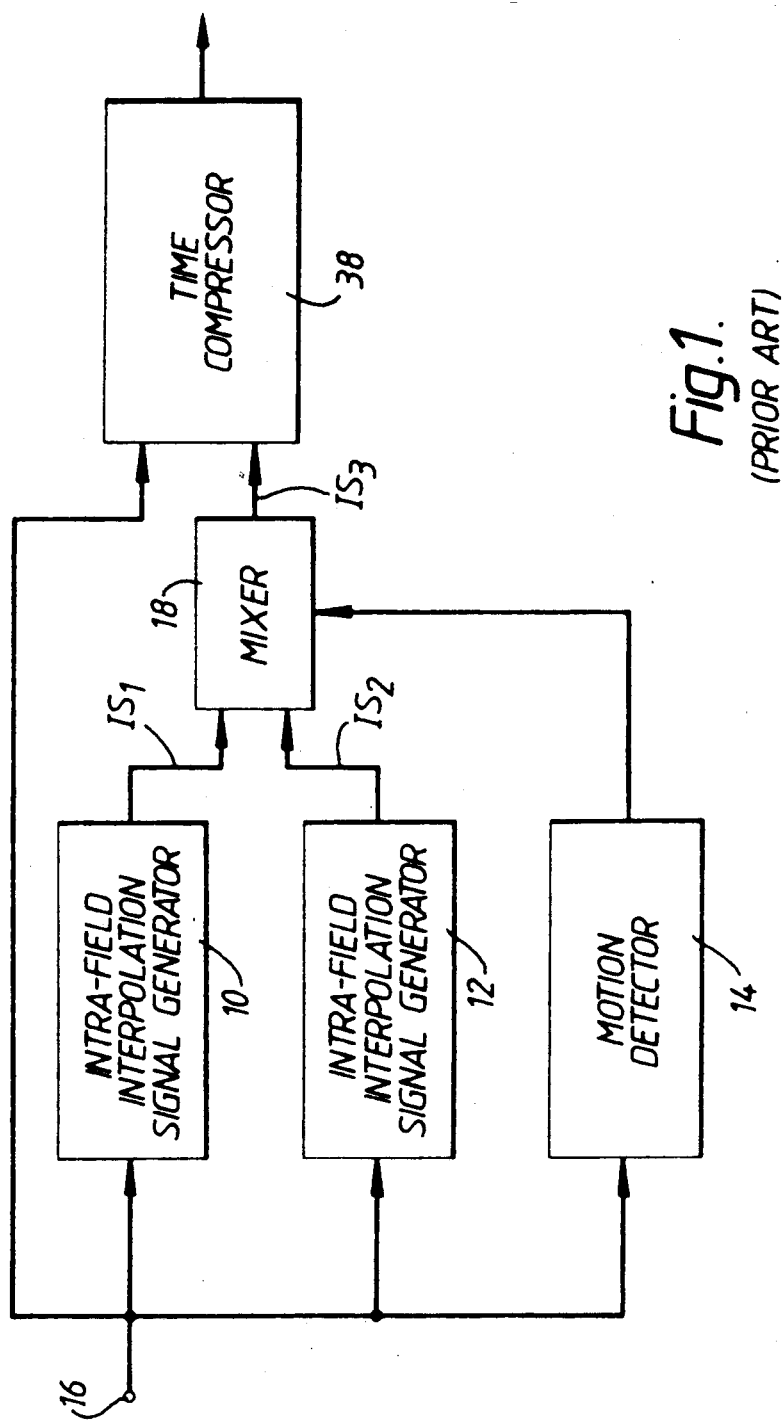
FIG. 1 is a block diagram showing a conventional motion adaptive progressive scanning conversion circuit.
Figure 2:
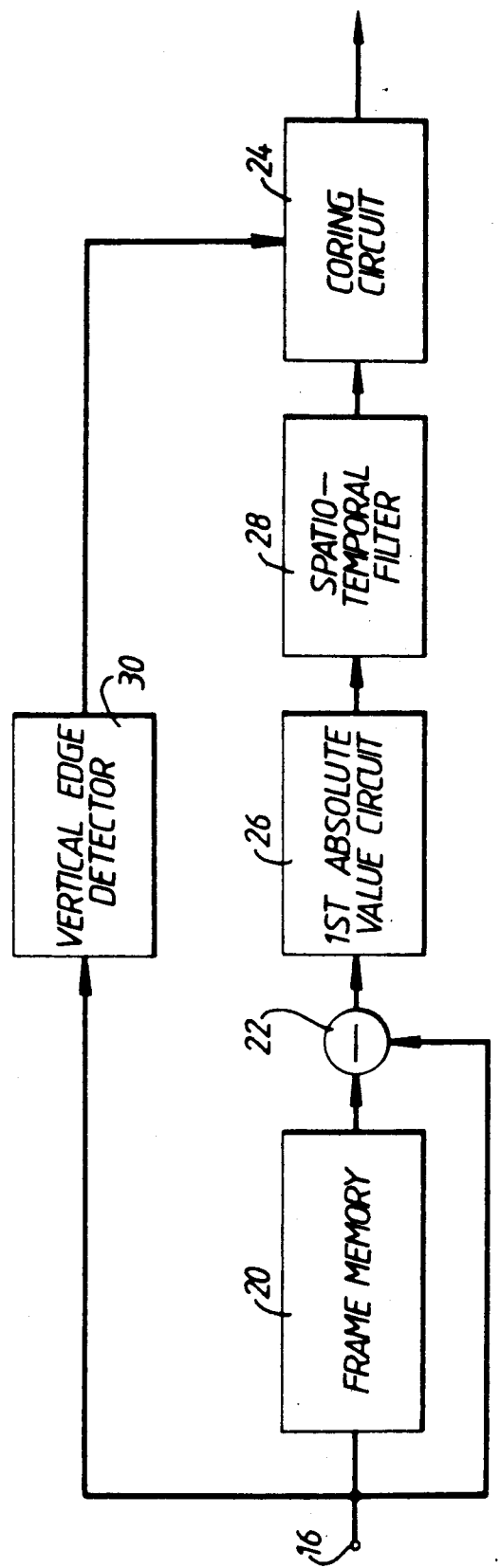
FIG. 2 is a block diagram showing the motion detector of FIG. 1 in detail.
Figure 3:
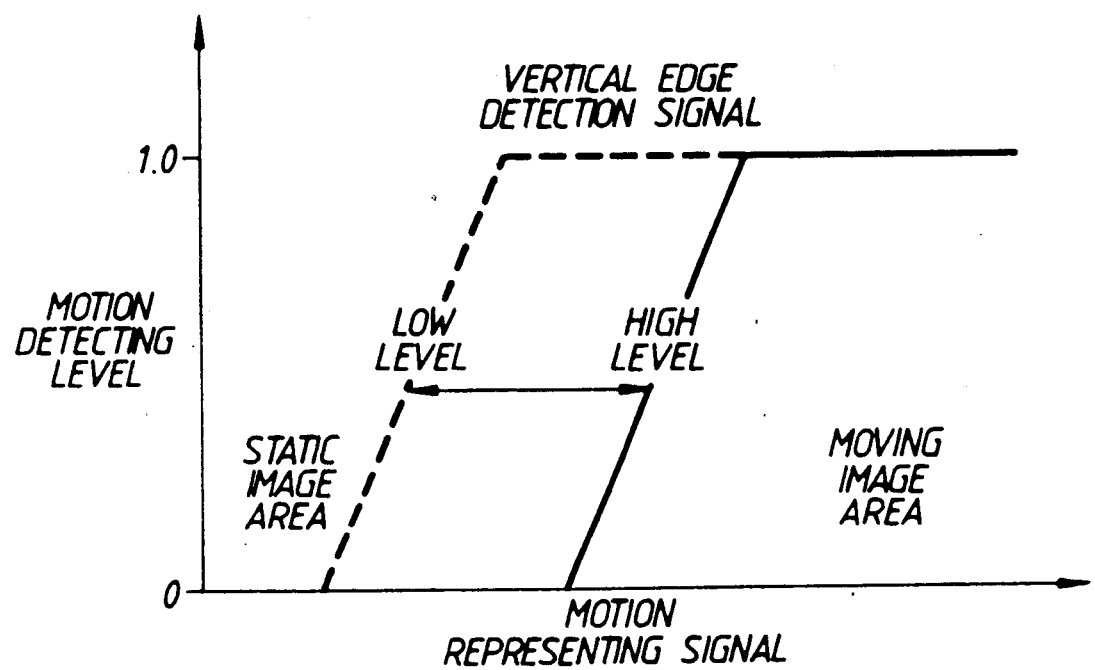
FIG. 3 is a graph showing a coring characteristic of the coring circuit in FIG. 2.

The present invention will be described in detail with reference to the FIGS. 6 through 8. Throughout the drawings, reference numerals or letters used in FIGS. 1 through 5 will be used to designate like or equivalent elements for simplicity of explanation. In this section, descriptions are focused to embodiments of the vertical edge detector which is the subject of the present invention. However, it is easily understood that these embodiments of the vertical edge detector are adapted for a motion adaptive progressive scanning conversion circuit, as shown in FIGS. 1 and 2.

Figure 6:
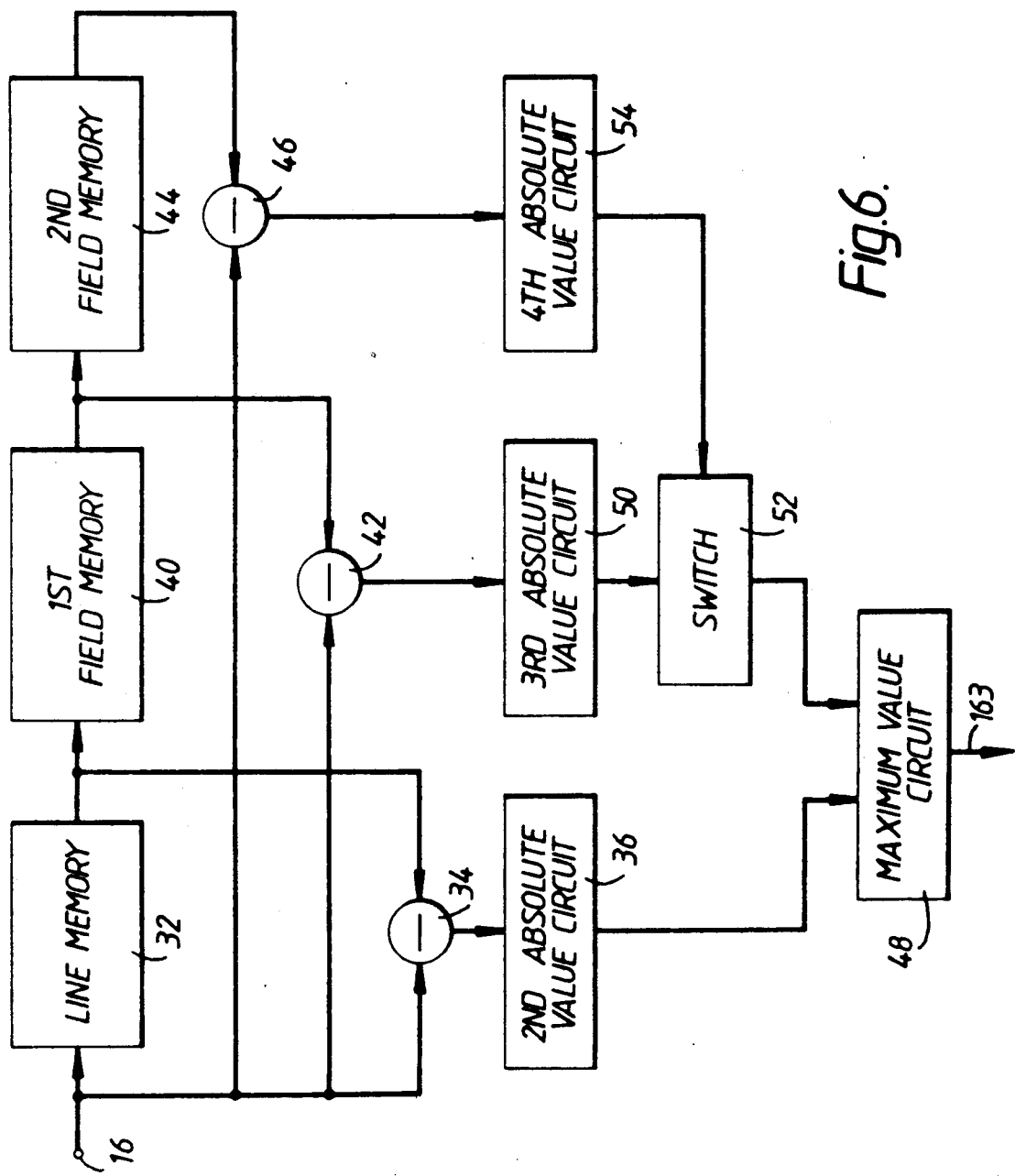
FIG. 6 is a block diagram showing a first embodiment of the vertical edge detection circuit according to the present invention.

FIG. 6 shows a first embodiment of the vertical edge detection circuit according to the present invention. In FIG. 6, an input terminal 16 receives an interlaced scanning television signal, i.e., an input television signal. The input television signal is applied to a line memory 32 which delays the input television signal for the 1H period.

The 1H delayed television signal output from the line memory 32 and the input television signal are applied to a second subtractor 34. The second subtractor 34 subtracts the signals with each other. Thus, a second difference signal of the signals is output from the second subtractor 34. The second difference signal will be referred to as an inter-line difference signal hereinafter.

The 1H delayed television signal output from the line memory 32 is further applied to a first field memory 40 which delays the 1H delayed television signal for the 262H period. Thus, a 263H delayed television signal is obtained by the field memory 40. The 263H delayed television signal output from the first field memory 40 and the input television signal are applied to a third subtractor 42. The third subtractor 42 subtracts the signals with each other. Thus, a third difference signal of the signals is output from the third subtractor 34. The third difference signal will be referred to as an inter-field difference signal hereinafter.

The 263H delayed television signal output from the first field memory 40 is further applied to a second field memory 44 which delays the 263H delayed television signal for the 262H period. Thus, a 525H delayed television signal is obtained by the second field memory 44. The 525H delayed television signal output from the second field memory 44 and the input television signal are applied to a fourth subtractor 46. The fourth subtractor 46 subtracts the signals with each other. Thus, a fourth difference signal of the signals is output from the fourth subtractor 34. The fourth difference signal will be referred to as an inter-frame difference signal hereinafter. Here, the combination of the first and second field memories 40 and 44 corresponds to a frame memory.

The inter-line difference signal is applied to a maximum value circuit 48 through a second absolute value circuit 36. The inter-field difference signal at the output of subtractor 42 is applied to the maximum value circuit 48 through a third absolute value circuit 50 and a switch 52. The inter-frame difference signal at the output of subtractor 46 is applied to the control terminal of the switch 52 through a fourth absolute value circuit 54.

The switch 52 is turned OFF when the inter-frame difference signal is higher than a predetermined level. Thus, transmission of the inter-field difference signal to the maximum value circuit 48 is prohibited by the switch 52. In this case, only the inter-line difference signal from the second subtractor 34 is applied to the maximum value circuit 48. The maximum value circuit 48 selectively outputs that input signal applied thereto having a maximum value. In this case, the maximum value circuit 48 receives only the inter-line difference signal. Thus, the inter-line difference signal is transmitted, which corresponds to the output of the mixer 18 in FIG. 1.

The switch 52 is turned ON when the inter-frame difference signal is lower than the predetermined level. Thus, the inter-line difference signal and the inter-field difference signal from the second subtractor 42 through the switch 52 are applied to the maximum value circuit 48. The maximum value circuit 48 selectively outputs the maximum of these input signals. Thus, the maximum one of the inter-line difference signal and the inter-field difference signal is selectively transmitted to the mixer through the maximum value circuit 48.

Figure 7:
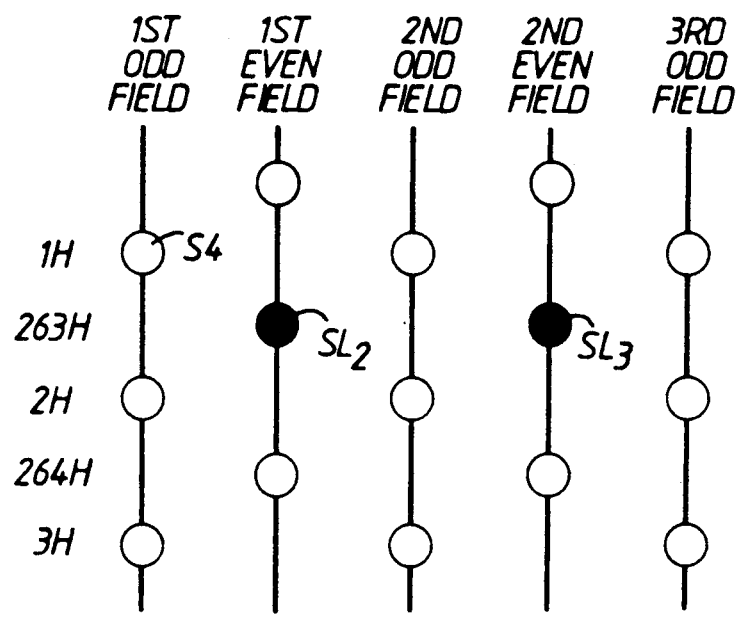
FIG. 7 is a diagram for explaining the operation of the vertical edge detection circuit of FIG. 6.

Referring now to FIG. 7, the operation of the first embodiment of the vertical edge detection circuit according to the present invention will be explained. FIG. 7 diagrammatically shows scanning lines in several successive fields of the input signal, i.e., the interlaced scanning television signal. In FIG. 7, it is assumed that the scanning lines SL1 on the first odd field make the inter-line difference signal. Also, the scanning line SL1 and a scanning line SL2 on the first even field make the inter-field difference signal. Similarly, the scanning line SL2 and a scanning line SL3 on the second even field make the inter-frame difference signal.

When the input signal on the terminal 16 carries a static image, the scanning lines SL2 and SL3 are almost equal with each other. Thus, the inter-frame difference signal with a very low level is applied to the control terminal of the switch 52. The switch 52 then turns ON so that the inter-field difference signal from the third subtractor 42 is applied to the maximum value circuit 48 together with the inter-line difference signal. The maximum value circuit 48 selects a maximum input signal applied thereto i.e., the best of the two difference signals. That is, the first embodiment of the vertical edge detection circuit can be adapted for detecting a vertical edge of image based on the scanning lines SL1 and SL2 between two adjacent fields as well as the scanning lines in the same field. The inter-field difference signal has a sufficient frequency response for the higher frequency over the 525/4 cph.

When the input signal on the terminal 16 carries a moving image, the scanning lines SL2 and SL3 are largely different from each other. Thus, the inter-frame difference signal with a very high level is applied to the control terminal of the switch 52. The switch 52 then turns OFF so that the inter-field difference signal from the third subtractor 42 is cut off by the switch 52. In case of the moving image, the image pattern differs between signals on different fields, for example, the scanning lines SL1 and SL2 on the two adjacent fields. Thus, it is not possible to detect the vertical edge by the inter-field difference signal. That is, in order to prevent erroneous detection of the inter-field difference signal as the vertical edge detection signal, the switch 52 is turned OFF and the inter-line difference signal is output to the output terminal 163 as the vertical edge detection signal.

Figure 8:
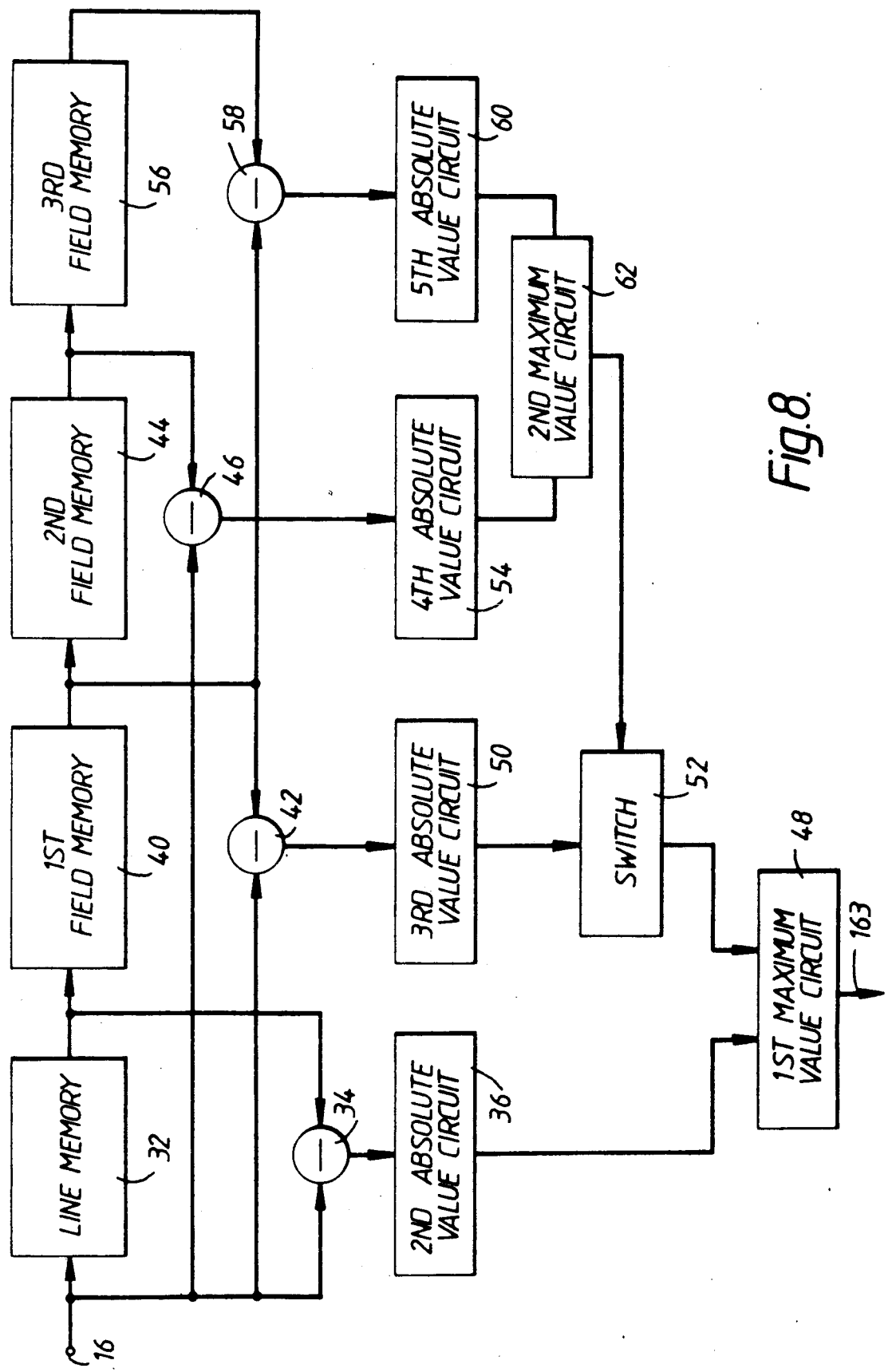
FIG. 8 is a block diagram showing a second embodiment of the vertical edge detection circuit according to the present invention.

Referring now to FIG. 8, a second embodiment of the vertical edge detection circuit according to the present invention. As shown in FIG. 8, the second embodiment of the vertical edge detection circuit includes a third field memory 56, a fifth subtractor 58, a fifth absolute value circuit 60 and a second maximum value circuit 62 further to those of the first embodiment. The third field memory 56 delays the output of the second field memory 44 for 263H period. The fifth subtractor 58 receives the outputs of the third field memory 56 and the first field memory 40. The output of the third field memory 56 is delayed from the output of the first field memory 40 for 525H period. Thus, the fifth subtractor 58 detects another inter-frame difference signal other than the inter-frame difference signal obtained by the fourth subtractor 46. The two inter-frame difference signals from the fourth and fifth subtractors 46 and 58 are applied to the second maximum value circuit 62 through the fourth and fifth absolute value circuits 54 and 60. The second maximum value circuit 62 selects the maximum input signed applied thereto i.e., the best of the two inter-frame difference signals. Then, the selected one of the inter-frame difference signals is used for controlling the switch 52.

Figure 4:
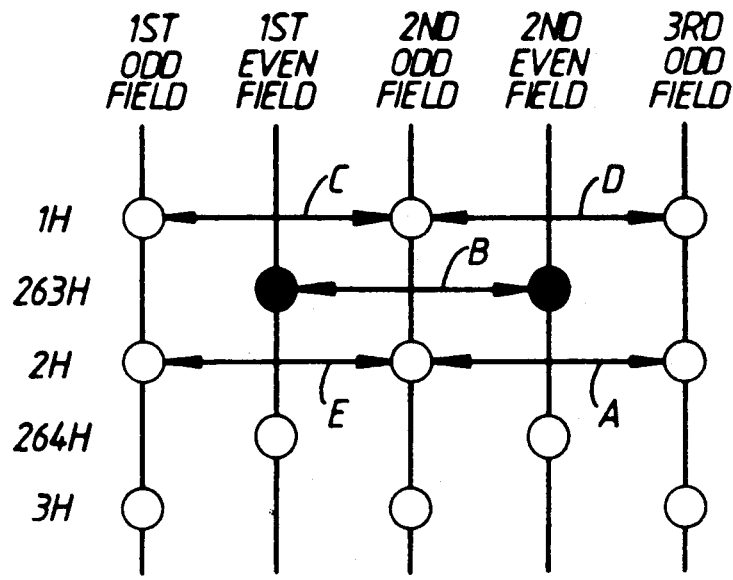
FIG. 4 is a diagram for explaining the operation of the spatiotemporal filter of FIG. 2.
Figure 5:
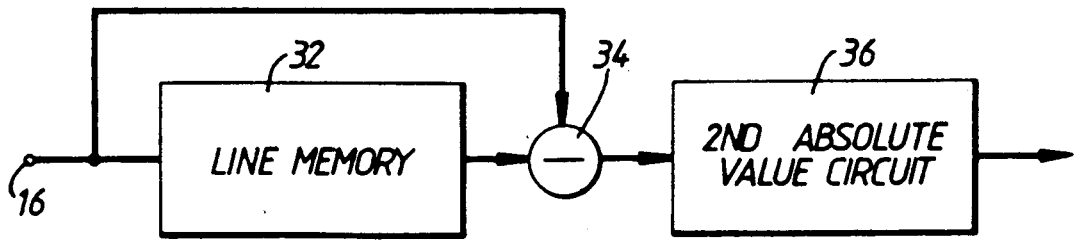
FIG. 5 is a block diagram of the vertical edge detector of FIG. 2 in detail.

The vertical edge detection circuit according to the present invention are also able to remove the drawback of the motion detector 14 (see FIG. 2), for the pitching movement of the static image, as described before. That is, the inter-frame difference signal is directly applied to the switch 52 without passing through any spatiotemporal filter. Accordingly, when an inter-frame difference signal which is not affected by the pitching movement of image, e.g., the sample A, as shown in FIG. 4, is obtained from the fourth subtractor 46 or the fifth subtractor 58, the vertical edge detection circuit judges correctly the static image as it is, even when a static image pitches due to noises or an unstable setting of a camera.

As described above, the present invention can provide an extremely preferable vertical edge detector.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A vertical edge detection circuit for a progressive scanning conversion circuit comprising:
   means for receiving an interlaced scanning television signal;
   means for generating an intra-field difference signal from the interlaced scanning television signal;
   means for generating an inter-field difference signal from the interlaced scanning television signal;
   means for generating an inter-frame difference signal from the interlaced scanning television signal; and
   means for selectively outputting a maximum of the intra-field and inter-field difference signals when the inter-frame difference signal is less than a predetermined value and for outputting said intra-field difference signal when said inter-frame difference signal is greater than said predetermined value.

2. A vertical edge detection circuit of claim 1, wherein the intra-field difference signal generating means includes a line memory for delaying the interlaced scanning television signal for one horizontal line period and a subtractor for subtracting the interlaced scanning television signal and the one horizontal line period delayed signal from each other and the inter-field difference signal generating means includes a field memory for delaying the interlaced scanning television signal for one field period and a subtractor for subtracting the interlaced scanning television signal and the one field period delayed signal from each other.

3. A vertical edge detection circuit of claim 1, wherein the inter-frame difference signal generating means includes a frame memory for delaying the interlaced scanning television signal for one frame period to produce a one frame period delayed signal and a subtractor for subtracting the interlaced scanning television signal and the one frame period delayed signal from each other.

4. A vertical edge detection circuit of claim 3, wherein each frame of the interlaced scanning television signal includes successive first and second fields and the inter-frame difference signal generating means includes a first inter-frame difference signal generating means which generates a first inter-frame difference signal from signals of the first fields in two successive frames, a second inter-frame difference signal generating means which generates a second inter-frame difference signal from signals of the second fields in the two successive frames, and means for selectively outputting a maximum value one of the first and second inter-frame difference signals.

5. A vertical edge detection circuit of claim 3, wherein the intra-field difference signal generating means includes a line memory for delaying the interlaced scanning television signal for one horizontal line period and a subtractor for subtracting the interlaced scanning television signal and the one horizontal line period delayed signal from each other, the inter-field difference signal generating means includes a field memory for delaying the interlaced scanning television signal for one field period and a subtractor for subtracting the interlaced scanning television signal and the one field period delayed signal from each other, and each of the first and second inter-frame difference signal generating means includes a frame memory for delaying the interlaced scanning television signal for one frame period and a subtractor for subtracting the interlaced scanning television signal and the one frame period delayed signal from each other.

* * * * *